United States Patent
Hsu et al.

(10) Patent No.: US 7,956,559 B2
(45) Date of Patent: Jun. 7, 2011

(54) MOTOR DRIVING DEVICE

(75) Inventors: Che-Wei Hsu, Taipei County (TW); Chi-Lin Hsu, Taipei County (TW)

(73) Assignee: Princeton Technology Corporation, Taipei County (TW)

( * ) Notice: Subject to any disclaimer, the term of this patent is extended or adjusted under 35 U.S.C. 154(b) by 373 days.

(21) Appl. No.: 12/361,229

(22) Filed: Jan. 28, 2009

(65) Prior Publication Data

US 2010/0007296 A1    Jan. 14, 2010

(30) Foreign Application Priority Data

Jul. 9, 2008  (TW) .............................. 97212148 U

(51) Int. Cl.
*H02P 1/00* (2006.01)

(52) U.S. Cl. ................................. 318/293; 318/400.29

(58) Field of Classification Search .................. 318/293, 318/400.26–400.29
See application file for complete search history.

(56) References Cited

U.S. PATENT DOCUMENTS

| 2008/0219649 A1* | 9/2008 | Hirata ........................... 388/811 |
| 2008/0310046 A1* | 12/2008 | Menegoli et al. ............... 360/75 |

* cited by examiner

*Primary Examiner* — Bentsu Ro
*Assistant Examiner* — Jorge L Carrasquillo
(74) *Attorney, Agent, or Firm* — Muncy, Geissler, Olds & Lowe, PLLC

(57) ABSTRACT

The invention discloses a motor driving device for generating at least one driving signal according to a clock signal corresponding to the output signal of a hall sensor. The motor driving device also controls rotation of a motor via at least one driving signal, wherein the at least one driving signal includes a first driving signal and a second driving signal and the motor driving device controls the rotation of the motor according to the first driving signal and the second driving signal.

11 Claims, 4 Drawing Sheets

MOTOR DRIVING DEVICE

CROSS REFERENCE TO RELATED APPLICATIONS

This Non-provisional application claims priority under 35 U.S.C. §119(a) on Patent Application No(s). 097212148, filed in Taiwan, Republic of China on Jul. 9, 2008, the entire contents of which are hereby incorporated by reference.

BACKGROUND OF THE INVENTION

1. Field of the Invention

The invention relates to a motor driving device, and more particularly to a soft-cut motor driving device for preventing backflow current.

2. Description of the Related Art

As electronic components increase requirement for more and more power, more and more heat has to be accordingly dissipated. Therefore, various heat-dissipation devices have already been developed, with the most popular being motor-controlled fans.

The description of a single-phase motor is discussed hereafter, with reference to FIG. 1 and FIG. 2. FIG. 1 illustrates a schematic diagram of a typical single-phase DC motor driving device. And FIG. 2 is a signal oscillogram of a typical motor driving device. As shown in FIG. 1 and FIG. 2, the typical single-phase DC motor driving device 10 comprises a Hall sensor 12, a detecting device 14, a control circuit 16 and a full-bridge driving circuit 18. Hall sensor 12 is used to detect the rotational position of the motor rotor and generate a first sensing signal $S_{D1}$ and a second sensing signal $S_{D2}$. The detecting device 14 is used to generate a clock signal $S_{CLK}$ according to the first sensing signal $S_{D1}$ and the second sensing signal $S_{D2}$. The control circuit 16 is used to generate four sets of driving signals A, B, C and D according to the clock signal $S_{CLK}$. The full-bridge driving circuit 18 comprises a first switch $SW_1$, a second switch $SW_2$, a third switch $SW_3$, a fourth switch $SW_4$ and an inductor L. The full-bridge driving circuit 18 is coupled to a supply voltage $V_{CC}$. The first switch $SW_1$ and the second switch $SW_2$ are respectively controlled by one of the driving signals A and D which are generated from the control circuit 16, while the third switch $SW_3$ and the fourth switch $SW_4$ are respectively controlled by the driving signal C, D which are generated from the control circuit 16. One end of the inductor L is coupled to the first switch $SW_1$ and the fourth switch $SW_4$ at the point $N_1$, and the other end of the inductor L is coupled to the third switch $SW_3$ and the second $SW_2$ at the point $N_2$. The first switch $SW_1$ and the second switch $SW_2$ are turned on or off in accordance with the third switch $SW_3$ and the fourth switch $SW_4$. Specifically, when the first switch $SW_1$ and the second switch $SW_2$ are turned on and the third switch $SW_3$ and the fourth switch $SW_4$ are turned off, an inductor current $I_L$ would flow through the inductor L from the point $N_1$ to the point $N_2$. Alternatively, when the first switch $SW_1$ and the second switch $SW_3$ are turned off and the third switch $SW_3$ and the fourth switch $SW_4$ are turn on, the inductor current $I_L$ on the inductor L would flow from the point $N_2$ to the point $N_1$. Therefore, the rotational direction and speed of the motor may be controlled by appropriately changing the quantity and the direction of the driving current of the inductor L. The first switch $SW_1$, the second switch $SW_2$, the third switch $SW_3$ and the fourth switch $SW_4$ may be respectively composed of transistors.

When the motor rapidly switches the switches $SW_1 \sim SW_4$ of the full-bridge circuit 18, a high-frequency voltage pulse may occur, which increases rotating motor noise. Moreover, during the switching process, if the current through the motor is unable to be released in a short time, the inductor current $I_L$ would flow back to the supply voltage $V_{CC}$ and generate a voltage surge to cause the motor driving device 10 broken.

FIG. 2 is a schematic diagram illustrating a signal generated by subtracting the second sensing signal $S_{D2}$ from the first sensing signal $S_{D1}$, the clock signal $S_{CLK}$, two driving signals $S_{C1}$ and $S_{C2}$ flowing through the point $N_1$ and $N_2$, respectively, and the inductor current $I_L$. When the first sensing signal $S_{D1}$ generated by the Hall sensor 12 is larger than the second sensing signal $S_{D2}$, the signal ($S_{D1}$-$S_{D2}$) from the first sensing signal $S_{D1}$ subtracting the second signal $S_{D2}$ is positive. Since the detecting device 14 is a hysteresis comparator, there exists a time de-glitch, as label t (de-glitch) in FIG. 2 shows, when comparing the clock signal $S_{CLK}$ generated by the detecting device 14 with the signal ($S_{D1}$-$S_{D2}$) made by subtracting the second sensing signal $S_{D2}$ from the first sensing signal $S_{D1}$. Note that the corresponding level of the clock signal $S_{CLK}$ changes as the motor switches switches, which is the so-called soft-cut technology. Specifically, the clock signal $S_{CLK}$ will alter the switches $SW_1 \sim SW_4$ of the full-bridge driving circuit 18 via the control circuit 16. However, even if supported by the soft-cut technology, if the switches $SW_1 \sim SW_2$ complete the "soft-cut" but the direction of the inductor current $I_L$ still doesn't immediately change, the inductor current $I_L$ will backflow to the supply voltage $V_{CC}$ via the turned-on switches $SW_1 \sim SW_4$ which are coupled to the supply voltage $V_{CC}$ and generate voltage surge at the output end as shown in the periods (d), (e) and (f) in FIG. 2.

Therefore, important issues when developing motor driving devices is to employ the soft-cut technology to drive motors with reduced noise, and employ protective devices to prevent the current of the motor to flow back to the supply voltage $V_{CC}$.

BRIEF SUMMARY OF INVENTION

Provided is a motor driving device, used to generate at least one driving signal according to a clock signal and employ the at least one driving signal to control the rotation of a motor, comprising an inverter, a first processing unit, a second processing unit, a first buffering unit and a second buffering unit. The inverter is used to invert the clock signal and generate an inverse signal, the first processing unit is coupled to the inverter and is used to generate a first processing signal according to the inverse signal, and the second processing unit is used to generate a second processing signal according to the clock signal. Additionally, the first buffering unit is coupled to the first processing unit and is used to generate a first driving signal according to the first processing signal, and the second buffering unit is coupled to the second processing unit and is used to generate a second driving signal according to the second processing signal, wherein the at least one driving signal comprises the first driving signal and the second driving signal, and the motor driving device controls the rotation of the motor according to the first driving signal and the second driving signal.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
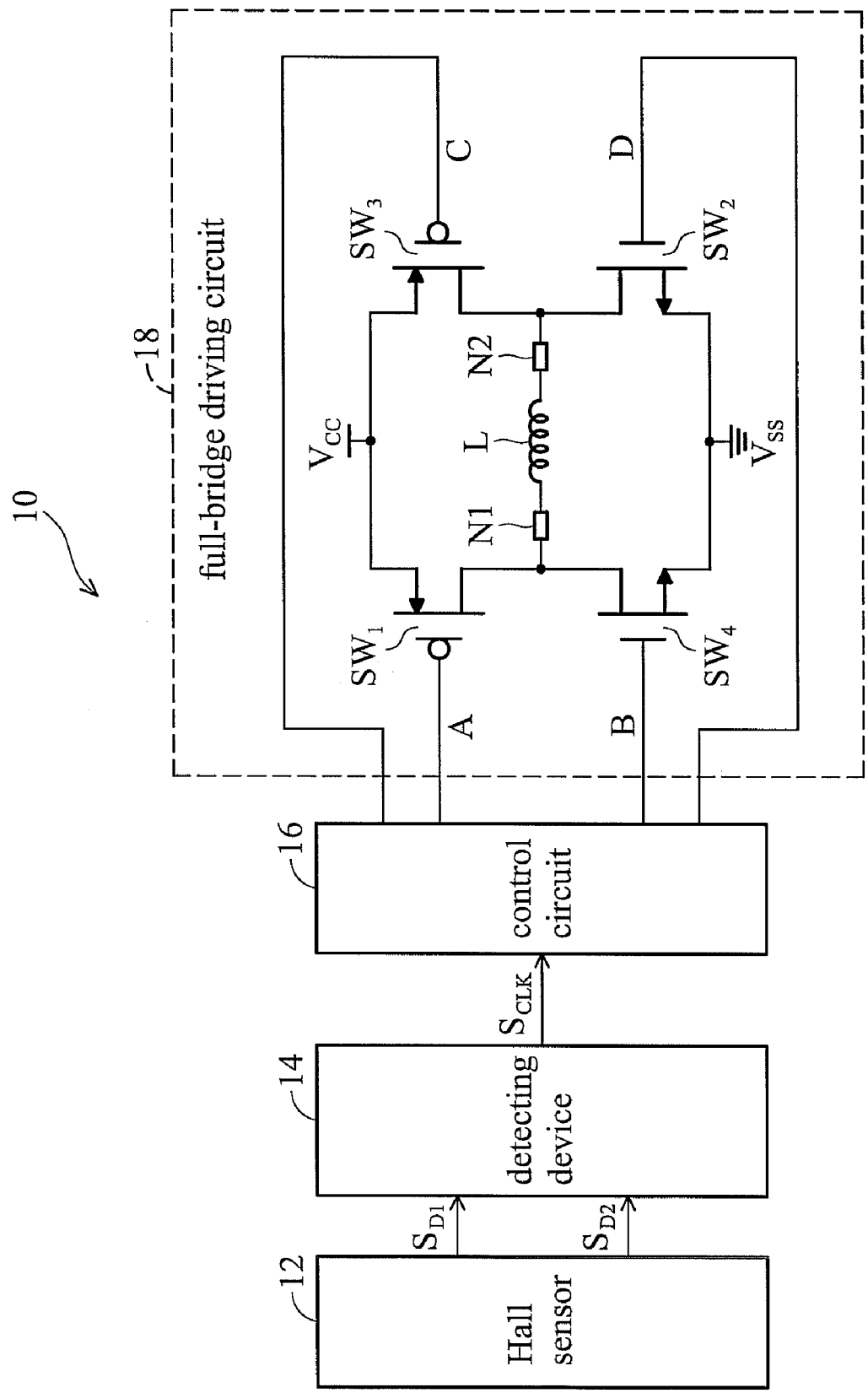
FIG. 1 illustrates a schematic diagram of a typical single-phase DC motor driving device.
Figure 2:
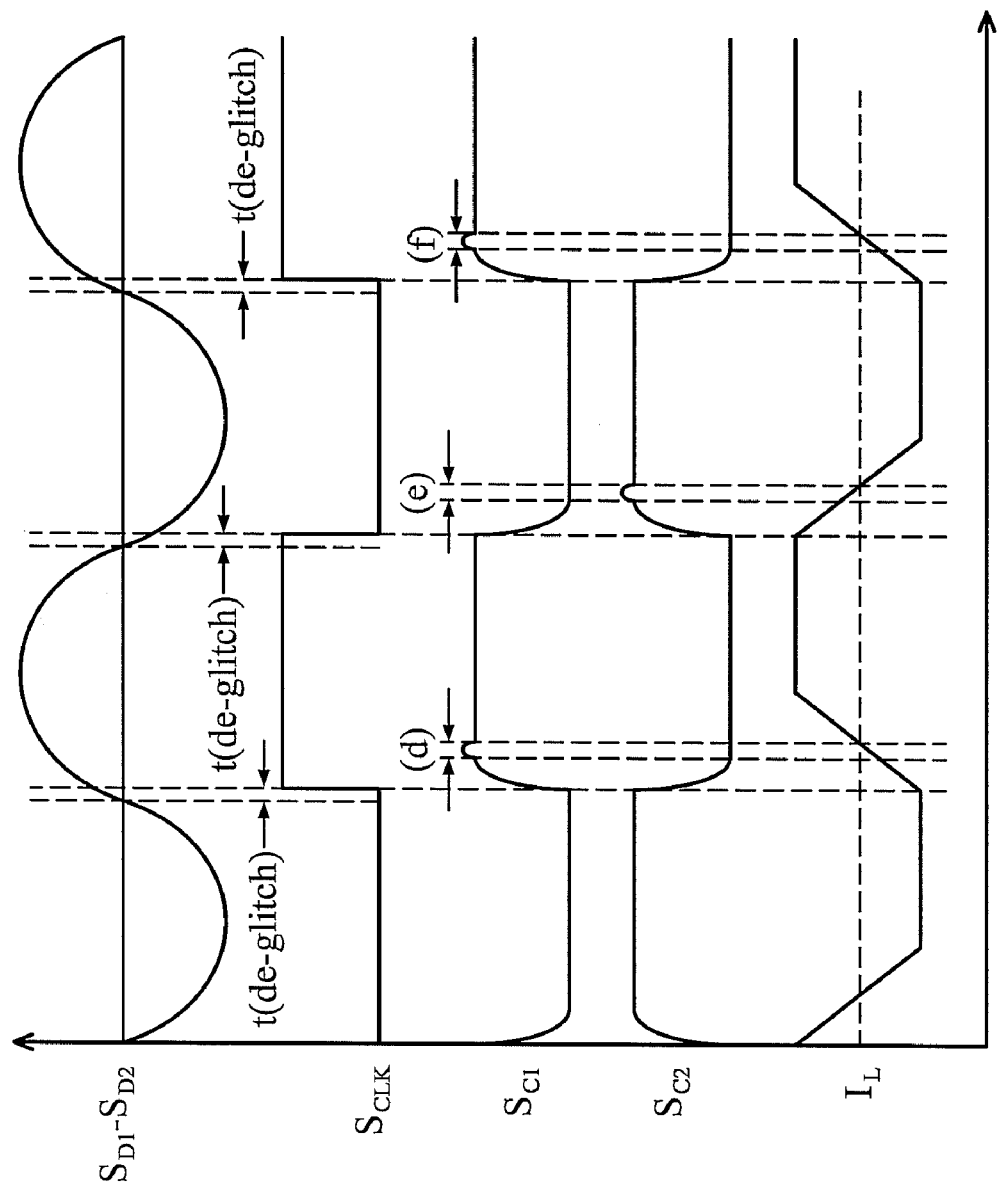
FIG. 2 is the signal oscillogram of a typical motor driving device.
Figure 3:
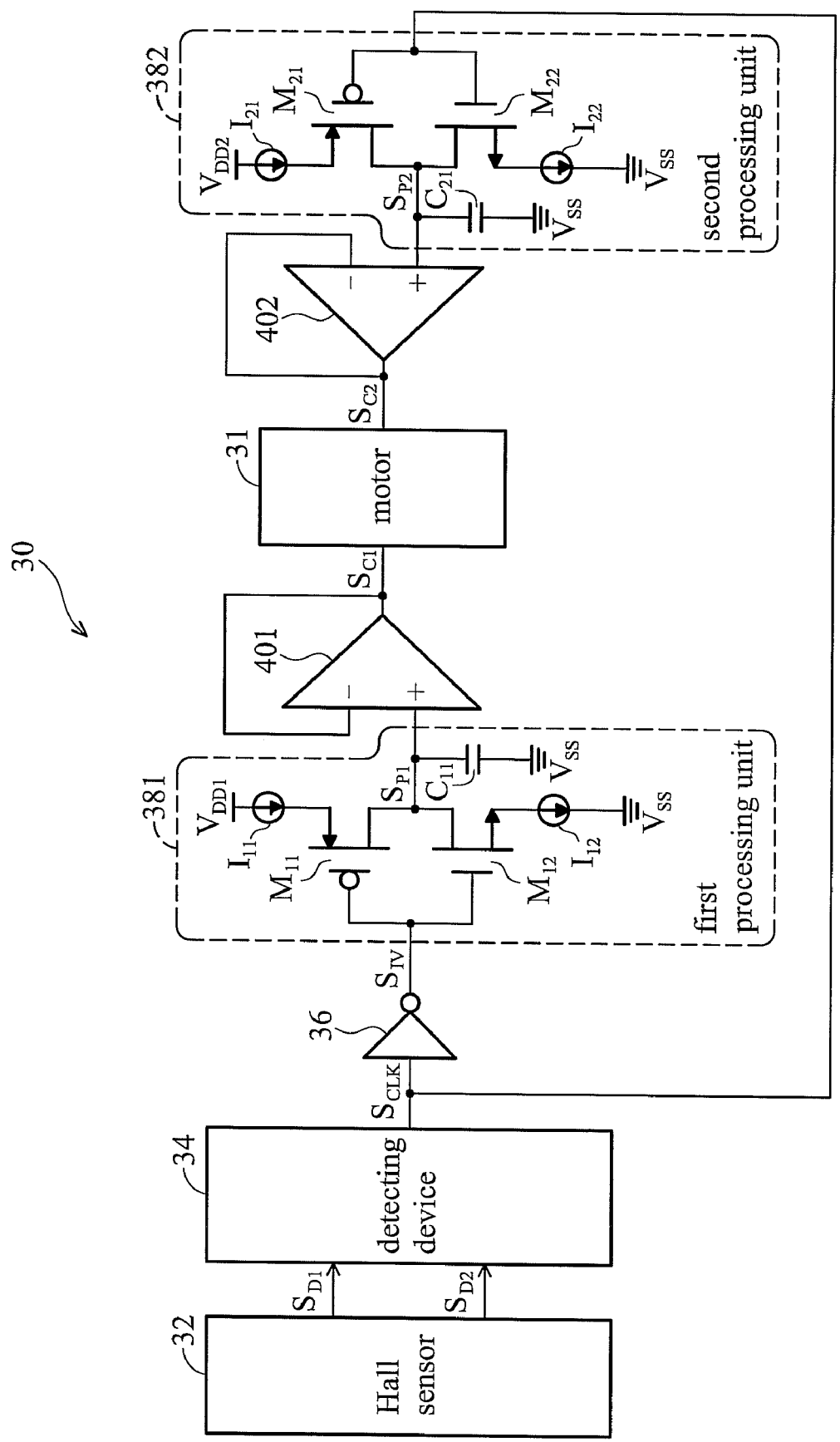
FIG. 3 is a schematic diagram of a motor driving device according to the present invention.

Referring to FIG. 3, a schematic diagram of motor driving device according to the present invention is shown. As shown in FIG. 3, the present invention is a motor driving device 30, which generates at least a driving signal $S_{C1}$ or $S_{C2}$ according to a clock signal $S_{CLK}$, and further uses the at least driving signal $S_{C1}$ or $S_{C2}$ to control the rotation of a motor 31. In one embodiment, the clock signal $S_{CLK}$ is a digital signal. The motor driving signal 30 comprises an inverter 36, a first processing unit 381, a second processing unit 382, a first buffering unit 401 and a second buffering unit 402. The inverter 36 is used to invert the clock signal $S_{CLK}$ and generate an inverse signal $S_{IV}$. The first processing unit 381 is coupled to the inverter 36 and is used to generate a first processing signal $S_{P1}$ according to the inverse signal $S_{IV}$. The second processing unit 382 is used to generate a second signal $S_{P2}$ according to the clock signal $S_{CLK}$. The first buffering unit 401 is coupled to the first processing unit 381 and is used to generate a first driving signal $S_{C1}$ according to the first processing signal $S_{P1}$. The second buffering unit 402 is coupled to the second processing unit 382 and is used to generate a second driving signal $S_{C2}$ according to the second processing signal $S_{P2}$, wherein the at least driving signal $S_{C1}$, $S_{C2}$ comprises the first driving signal $S_{C1}$ and the second driving signal $S_{C2}$. Meanwhile, the motor driving device 30 employs the first driving signal $S_{C1}$ and the second driving signal $S_{C2}$ to control the motor 31 to rotate or stop, wherein the motor driving device 30 may be disposed in an integrated circuit.

In one embodiment, the motor driving device 30 comprises a Hall sensor 32 and a detecting device 34. The Hall sensor 32 is used to detect whether the motor 31 is rotating and generates a first sensing signal $S_{D1}$ and a second sensing signal $S_{D2}$. The detecting device 34 is coupled to the Hall sensor 32 and is used to generate the clock signal $S_{CLK}$ according to the first sensing signal $S_{D1}$ and the second sensing signal $S_{D2}$. In one embodiment, the detecting device 34 is a hysteresis comparator, which is used to compare the first sensing signal SD1 with the second sensing signal $S_{D2}$ to generate the clock signal $S_{CLK}$.

The first processing unit 381 comprises a first first voltage source $V_{DD1}$, a first first current source $I_{11}$, a first first transistor $M_{11}$, a first second transistor $M_{12}$, a first second current source $I_{12}$ and a first first capacitor $C_{11}$. The first first current source $I_{11}$ is coupled to the first first voltage $V_{DD1}$. The first first transistor $M_{11}$ comprises a first first end, a first second end and a first third end, wherein the first first end is coupled to the first first current source $I_{11}$, and the first second end is coupled to the output of the invertor 36 and is used to receive the inverse signal $S_{IV}$. The first second transistor $M_{12}$ comprises a second first end, a second second end and a second third end, wherein the second first end is coupled to the first third end of the first first transistor $M_{11}$, the second second end is coupled to the output end of the inverter 36 and is used to receive the inverse signal $S_{IV}$. The first second current $I_{12}$ is coupled between the second third end of the first second transistor $M_{12}$ and a ground VSS. The first first capacitor $C_{11}$ comprises a first end and a second end, wherein the first end is coupled between the first third end of the first first transistor $M_{11}$ and the second first end of the first second transistor $M_{12}$, the second end is coupled to the ground $V_{SS}$, and the first first capacitor $C_{11}$ is used to charge and discharge to generate the first processing signal $S_{P1}$.

The second processing unit 382 comprises a second first voltage $V_{DD2}$, a second first current source $I_{21}$, a second first transistor $M_{21}$, a second second transistor $M_{22}$, a second second current source $I_{22}$ and a second first capacitor $C_{21}$. The second first current source $I_{21}$ is coupled to the second first voltage source $V_{DD2}$. The second first transistor $M_{21}$ comprises a first first end, a first second end and a first third end, wherein the first first end is coupled to the second first current source $I_{22}$ and the first second end is coupled to the detecting device 34 and is used to receive the clock signal $S_{CLK}$. The second second transistor $M_{22}$ comprises a second first end, second second end and a second third end, the second first end is couplet to the first third end of the second first transistor $M_{21}$, the second second end is coupled to the detecting device 34, and the second second end is used to receive the clock signal $S_{CLK}$. The second second current source $I_{22}$ is coupled between the second third end of the second second transistor $M_{22}$ and the ground $V_{SS}$. The second first capacitor $C_{21}$ comprises a first end and a second end, wherein the first end is coupled between the first third end of the second first transistor $M_{21}$ and the second first end of the second second transistor $M_{22}$, the second end is coupled to the ground $V_{SS}$, and the second first capacitor $C_{21}$ is used to charge and discharge to generate the second processing signal $S_{P2}$.

The first buffering unit 401 comprises a positive input end (+), a negative input end (−) and an output end, wherein the positive input end (+) is coupled to the first processing unit 381, and the negative input end (−) is coupled to the output end. The first buffing 401 is used to generate the first driving signal $S_{C1}$ according to the first processing signal $S_{P1}$, and further control the motor 31 to rotate or stop according to the first driving signal $S_{C1}$. The second buffering unit 402 also comprises a positive input end (+), a negative input end (−) and an output end, the positive input end (+) of the second buffering unit 402 is coupled to the second processing unit 382, and the negative input end (−) of the second buffering unit 402 is coupled to the output end and is used to generate the second driving signal $S_{C2}$ according to the second processing signal $S_{P2}$ and further control the motor 31 to rotate or stop according to the second driving signal $S_{C2}$. Each of the first buffering unit 401 and the second buffering unit 402 may be a unity gain buffer; and each of the output end of the first buffering unit 401 and the output end of the second buffering unit 402 may form a full-bridge driving circuit.

Figure 4:
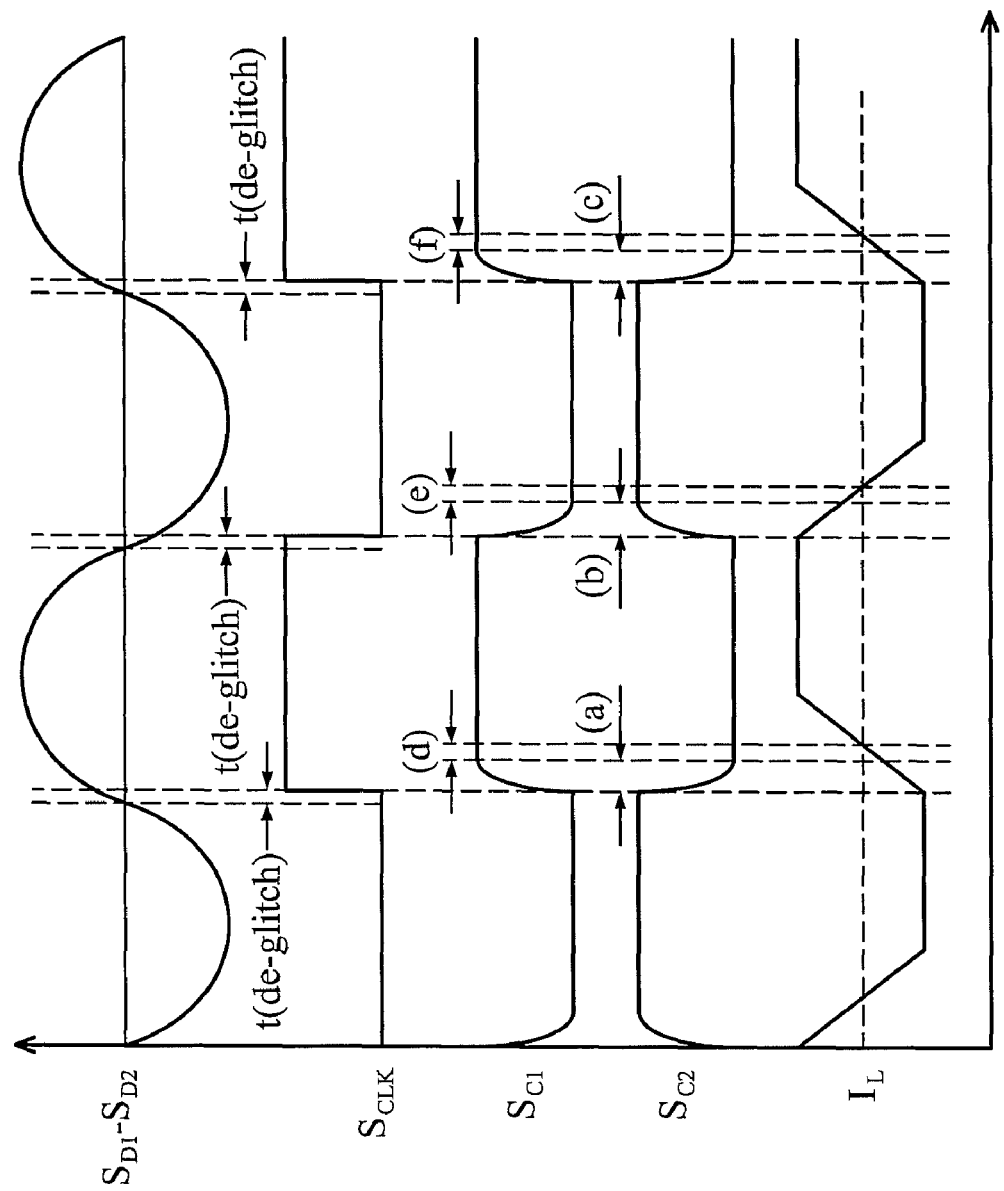
FIG. 4 is the signal oscillogram of a motor driving device according to the present invention.

Referring to FIG. 4, the signal oscillogram of the motor driving devices according to the present invention is shown. A signal ($S_{D1}$-$S_{D2}$) generated by subtracting the second sensing signal $S_{D2}$ from the first sensing signal $S_{D1}$, the clock signal $S_{CLK}$, and two driving signals $S_{C1}$ and $S_{C2}$ according to the present invention is shown in FIG. 4. The motor driving device 30 employs charge pumps as the first processing unit 381 and second processing unit 382 and employs the clock signal $S_{CLK}$ to control the charge pumps to charge or discharge. The motor driving device 30 control the charging/discharging time of the capacitors $C_{11}$, $C_{21}$ by changing the charging/discharging current $I_{11}$, $I_{12}$, $I_{21}$, $I_{22}$ of the charge pump and the size of the capacitors $C_{11}$, $C_{21}$, as shown in the periods (a), (b) and (c) in FIG. 4. Finally, soft-cut is achieved by driving the motor 31 via the unity gain buffer 401 and 402. Moreover, after coupling the unity gain buffer 401 and 402 to the charge pump (processing unit 381, 382) respectively, when the backflow occurs, the component coupled to the ground comprised in each output end of the two unity gain buffers 401 and 402 may be turned on due to the negative feedback mechanism, thus allowing the inductor current $I_L$ to be released so that the output voltage of the motor 31 may be controlled to the level as the output voltage of the charge pumps (processing unit 381, 382), as shown in the periods (d), (e), and (f) in FIG. 4. Therefore, the unity gain buffer 401 and 402 employed by the present motor driving device 30 prevents the inductor current $I_L$ from flowing back to the supply voltage $V_{CC}$ at the time when the motor 31 changes its phases.

Since the charge pumps and unity gain buffers are coupled with each other in cascade, the present motor driving device achieves the control method of soft-cut motor driving and stabilizes the output voltage of the motor to prevent backflow from occurring and flowing back to the supply voltage and causing damage to the motor driving circuit. Therefore, the present invention not only achieves soft-cut of the motor, but also efficiently prevents voltage surge, reduces noise of the motor, increases the reliability and operating range of systems, and solves the problems of the prior art.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A motor driving device, used to generate at least one driving signal according to a clock signal and employ the at least one driving signal to control the rotation of a motor, comprising:
   an inverter, used to invert the clock signal and generate an inverse signal;
   a first processing unit, coupled to the inverter and is used to generate a first processing signal according to the inverse signal;
   a second processing unit, used to generate a second processing signal according to the clock signal;
   a first buffering unit, coupled to the first processing unit and is used to generate a first driving signal according to the first processing signal; and
   a second buffering unit, coupled to the second processing unit and is used to generate a second driving signal according to the second processing signal,
   wherein the at least one driving signal comprises the first driving signal and the second driving signal, and the motor driving device controls the rotation of the motor according to the first driving signal and the second driving signal.

2. A motor driving device as claimed in claim 1, further comprising:
   a Hall sensor, used to detect whether the motor is rotating and generate a first sensing signal and a second sensing signal; and
   a detecting device, coupled to the Hall sensor, used to generate the clock signal according to the first sensing signal and the second sensing signal.

3. A motor driving device as claimed in claim 2, wherein the clock signal is a digital signal.

4. A motor driving device as claimed in claim 2, wherein the detecting device is a hysteresis comparator, which is used to compare the first sensing signal with the second sensing signal and generate the clock signal.

5. A motor driving device as claimed in claim 1, wherein the first processing unit comprises:
   a first first voltage source;
   a first first current source, coupled to the first first voltage source;
   a first first transistor, having a first first end, a first second end and a first third end, wherein the first first end is coupled to the first first current source, and the first second end is coupled to a output of the inverter and is used to receive the inverse signal at the first second end;
   a first second transistor, having a second first end, a second second end and a second third end, wherein the second first end is coupled to the first third end of the first first transistor, the second second end is coupled to the output end of the inverter and is used to receive the reverse signal;
   a first second current source, coupled between the second third end of the first second transistor and a ground; and
   a first first capacitor, having a first end and a second end, wherein the first end is coupled to the first third end of the first first transistor and the second first end of the first second transistor, and the second end is coupled to the ground, and the first first capacitor is used to charge or discharge to generate the first processing signal.

6. A motor driving device as claimed in claim 5, wherein the second processing unit comprises:
   a second first voltage source;
   a second first current source, coupled to the second first voltage source;
   a second first transistor, having a first first end, a first second end and a first third end, wherein the first first end is coupled to the second first current source, and the first second end is coupled to a detecting device and is used to receive the clock signal at the second second end;
   a second second transistor, having a second first end, a second second end and a second third end, wherein the second first end is coupled to the first third end of the second first transistor, the second second end is coupled to the detecting device and is used to receive the clock signal;
   a second second current source, coupled between the second third end of the second second transistor and the ground; and
   a second first capacitor, having a first end and a second end, wherein the first end is coupled to the first third end of the second first transistor and the second first end of the second second transistor, and the second end is coupled to the ground, and the second first capacitor is used to charge or discharge to generate the second processing signal.

7. A motor driving device as claimed in claim 6, wherein the first buffering unit comprises a positive input end, a negative input end and an output end, wherein the positive input end is coupled to the first processing unit, the negative input end is coupled to the output end, and is used to generate the first driving signal according to the first processing signal and further accordingly control the motor to rotate or stop according to the first driving signal.

8. A motor driving device as claimed in claim 7, wherein the second buffering unit comprises a positive input end, a negative input end and an output end, wherein the positive input end is coupled to the second processing unit, the negative input end is coupled to the output end, and is used to generate the second driving signal according to the second processing signal and further control the motor to rotate or stop according to the second driving signal accordingly.

9. A motor driving device as claimed in claim 8, wherein each of the first buffering unit and the second buffering unit is a unity gain buffer.

10. A motor driving device as claimed in claim 8, wherein each of the output end of the first buffering unit and the output end of the second buffering unit is a full-bridge driving circuit.

11. A motor driving device as claimed in claim 1, wherein the motor driving circuit is an integrated circuit.

* * * * *